(12) United States Patent
Das Gupta et al.

(10) Patent No.: US 8,144,925 B2
(45) Date of Patent: Mar. 27, 2012

(54) MAPPING BASED MESSAGE ENCODING FOR FAST RELIABLE VISIBLE WATERMARKING

(75) Inventors: Mithun Das Gupta, Cupertino, CA (US); Jing Xiao, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/862,325

(22) Filed: Aug. 24, 2010

(65) Prior Publication Data

US 2012/0051582 A1 Mar. 1, 2012

(51) Int. Cl.
*G06K 9/00* (2006.01)

(52) U.S. Cl. ......................................................... 382/100

(58) Field of Classification Search .................. 382/100; 713/176
See application file for complete search history.

(56) References Cited

U.S. PATENT DOCUMENTS

| 5,245,165 | A | * | 9/1993 | Zhang ............................ 235/454 |
| 5,764,770 | A | * | 6/1998 | Schipper et al. .............. 713/176 |
| 7,103,230 | B1 | | 9/2006 | Jam et al. |
| 7,580,543 | B2 | | 8/2009 | Iwamura |
| 7,613,317 | B2 | | 11/2009 | Lu |
| 7,623,673 | B2 | | 11/2009 | Mercier |
| 7,630,511 | B2 | | 12/2009 | Zhao et al. |
| 7,697,716 | B2 | | 4/2010 | Miller et al. |
| 7,711,144 | B2 | | 5/2010 | Hannigan et al. |
| 2001/0052076 | A1 | | 12/2001 | Kadono |
| 2002/0054356 | A1 | | 5/2002 | Kurita et al. |
| 2002/0126842 | A1 | * | 9/2002 | Hollar ........................... 380/201 |
| 2003/0123660 | A1 | | 7/2003 | Fletcher et al. |
| 2005/0018846 | A1 | * | 1/2005 | Kanai et al. ................... 380/252 |
| 2005/0025338 | A1 | * | 2/2005 | Zhao et al. .................... 382/100 |
| 2005/0089189 | A1 | | 4/2005 | Langelaar |
| 2006/0115112 | A1 | | 6/2006 | Yeung et al. |
| 2006/0126891 | A1 | | 6/2006 | Seroussi et al. |
| 2006/0188129 | A1 | | 8/2006 | Mayboroda et al. |
| 2006/0222203 | A1 | | 10/2006 | Mercier |
| 2006/0232619 | A1 | | 10/2006 | Otsuka et al. |
| 2007/0071320 | A1 | * | 3/2007 | Yada ............................. 382/181 |
| 2007/0297012 | A1 | * | 12/2007 | Fan ............................... 358/3.28 |
| 2008/0186544 | A1 | * | 8/2008 | Lapstun et al. ............. 358/3.28 |
| 2009/0021793 | A1 | | 1/2009 | Lu et al. |

OTHER PUBLICATIONS

Liu et al. "A Robust Image Watermarking Method Based on Adaptive Feature Points Detection." Proceedings of the International Conference on Communications, Circuits and Systems, Jun. 2006, pp. 49-53.*

* cited by examiner

*Primary Examiner* — Jon Chang
(74) *Attorney, Agent, or Firm* — Rosalio Haro (57) ABSTRACT

A watermarking system uses two distinct bit patterns to identify three distinct bits, a logic 0 bit, a logic 1 bit, and a marker bit that demarcates message block boundaries. A correct orientation is determining by rotating the input image by 90 degrees and determining which orientation renders the greatest number of valid bits. Bit mapping is used from block to block to predefine a shifting starting position for a watermark message within consecutive message blocks.

15 Claims, 10 Drawing Sheets

MAPPING BASED MESSAGE ENCODING FOR FAST RELIABLE VISIBLE WATERMARKING

BACKGROUND

1. Field of Invention

The present invention is geared toward the field of watermarking scanned images, and in particular, is geared toward inserting watermark codes onto an input image and extracting watermark codes from the input image.

2. Description of Related Art

Visible watermarking is the science of overlaying messages comprised of bit-encoded, character strings onto a user-provided image (i.e. an input image) prior to printing the input image. The resultant, printed image is a watermarked image, and it is said to have been watermarked with a secret, or hidden, watermark message. The principle motivation behind such encoding is that when properly encoded, the watermark message can be extracted from a scan of the previously-printed, watermarked image.

Visible watermarking schemes can be useful in many scenarios, such as having a user ID encoded onto documents while printing from a network printer, having the date and time of printing inconspicuously placed on a printed document, etc.

Although watermark messages may be incorporated as textual messages overlaid on an output image, it is preferred that the watermark message not be readily discernable by a casual viewer of the output image. That is, it is typically preferred that the watermark message not be printed using text characters, which can be freely read since such a message is likely to become a distraction to a casual viewer; moving the casual viewer's attention away from the output image itself. It is therefore customary to first encode the watermark message using an encoding scheme that is not readily discernable by a casual viewer, and then to overlay the encoded message on the output image. Preferably, the encoded message should be innocuous to the casual viewer and not divert attention from the main subject matter of the output image.

One typical method of encoding a message is to use the standard ASCII code, which, as it is known in the art, provides a distinct eight-bit, binary code per text character. In this way, the ASCII encoded message may be printed as a series of 0's and 1's overlaid on the output image, and is not easily discernable by a casual viewer. However, it is typically not an optimal solution to clutter an output image with a series of 0's and 1's detectable by the human eye.

One approach to hiding the encoded message is to encode the watermark message into text characters that may already be a part of the output image. In this approach, an existing text character within the output image is divided into an upper region and a lower region, and relative darkness levels of the two regions are modulated to inscribe the encoded watermark message. For example, the upper region of a text character may be made darker than its lower region to represent a logic-0. Alternatively, the lower region of a text character may be made darker than its upper region to represent a logic-1. This approach succeeds in effectively hiding the watermark message from a casual reader of the output document, but to some extent, it may be dependent upon the quality of scanning and printing equipment used to process the watermarked output image to successfully inscribe the watermarked message and to successfully extract the watermarked message after multiple scan-and-print cycles.

SUMMARY OF INVENTION

An object of the present invention is to provide a simplified method of encoding and extracting a watermark message.

Another object of the present invention is to lessen the distraction to a casual viewer caused by the watermark message on an image.

These objects are met in method of watermarking a text message onto an input image, including the following steps: (a) converting the text message into a binary-coded data bit sequence of logic-0 data bits and logic-1 data bits, and arranging said binary-coded data bit sequence within a message block defined by block boundaries consisting of non-data, marker bits; (b) assigning a first bit-pattern symbol to logic-0 data bits within said binary-coded data bit sequence, said first bit-pattern symbol being a first predefined geometric arrangement of disjointed rectangular segments laid out to form concentric triangular arrangements; (c) assigning a second bit-pattern symbol to logic 1 data bits within said binary-coded data bit sequence, and assigning said second bit-pattern symbol to said non-data, marker bits, said second bit-pattern symbol being a second predefined geometric arrangement of disjointed rectangular segments laid out to form concentric triangular outlines; (d) mapping a plurality of said message blocks onto said input image, and writing said first and second bit-pattern symbols on said input image in according to said mapping.

In this approach, the first bit-pattern symbol forms a first right triangle, the second bit-pattern symbol forms a second right triangle, the first and second right triangles being a similar size, and when placed side-by-side, the orientations of the first and second right triangles causing the apex of the first right triangle to align with the base of the second triangle and the apex of the second triangle to align with the base of the first triangle, the side of the first triangle to be parallel to the side of the second triangle, and an extension of the hypotenuse of the first right triangle to intersect an extension of the hypotenuse of the second right triangle. In this case, the side of the first right triangle is on its left, and the side of the second right triangle is on its left.

It is further preferred that the concentric triangular outlines are formed from two concentric, partial square outlines, each consisting of a collection of the disjointed rectangular segments arranged in series, the disjointed rectangular segments having lengths longer than their widths, and each partial square outline missing one corner region along a common diagonal of the partial square outlines, wherein each missing corner region is less than half the its respective partial square outline, and the two corners of each concentric square outline adjoining its respective missing region extend partially into the region missing the corner.

Additionally step (a) includes padding the top of consecutive message blocks with one or two rows of logic-0 bits in an alternative fashion; inserting a predefined data bit sequence of fixed bit-length immediately in front of the first data bit of the binary-coded data bit sequence.

Preferably, The method of claim 1, a correct orientation of the input image is determined by placing the input image in four orientations shifting from 0 degrees, to 90 degrees, to 270 degrees, to 360 degrees and determining the number of valid bit-pattern symbols recoverable at each orientation, wherein the orientation that renders the largest number of valid bit-pattern symbols is deemed the correct orientation.

Preferably, second bit-pattern symbols assigned to logic-1 data bits are discernable from second bit-pattern symbols assigned to marker bits demarcating block boundaries by: (i) for each row of bit-pattern symbols, determining the number of first bit-pattern symbols and the number of second bit-pattern symbols, assigning a row-edge-score by subtracting the number of first bit-pattern symbols from the number of second bit-pattern symbols and dividing the result by the total number of bit-pattern symbols in that row, creating a row histogram of the row-edge-scores, thresholding the row histogram with a threshold value determined from the mean of all row-edge-scores plus 1.75 times the row histogram's standard deviation, wherein any row with a row-edge-score above the row threshold is identified as a potential row-boundary.

In this approach, step (i) further includes taking the median of the inter-peak distances of the row histogram as an inferred horizontal block dimension, and only potential row-boundary rows whose location when calculated into the median of the inter-peak distances does not change the previous median value by more than a first predefined tolerance are deemed horizontal block boundaries. Preferably the first predefined tolerance is 5%.

This approach preferably further includes (ii) for each column of bit-pattern symbols, determining the number of first bit-pattern symbols and the number of second bit-pattern symbols, assigning a column-edge-score by subtracting the number of first bit-pattern symbols from the number of second bit-pattern symbols and dividing the result by the total number of bit-pattern symbols in that column, creating a column histogram of the column-edge-scores, thresholding the column histogram with a threshold value determined from the mean of all column-edge-scores plus 1.75 times the column histogram's standard deviation, wherein any column with a column-edge-score above the column threshold is identified as a potential column-boundary.

In this case, step (ii) further includes taking the median of the inter-peak distances of the column histogram as an inferred vertical block dimension, and only potential column-boundary rows whose location when calculated into the median of the inter-peak distances does not change the previous median value by more than a second predefined tolerance are deemed horizontal block boundaries. Preferably, the second predefined tolerance is 5% bit positions.

Preferably, the binary-coded data bit sequence is determinable by collecting all the logic-0 bits and logic-1 bits from corresponding locations within all the message blocks, identifying bits locations that cannot be identified as a logic-0 or a logic-1 as unknown, identifying the dominant data bit at each bit location while ignoring bit locations identified as unknown, and assigning each bit location its dominant data bit value.

Preferably, the data bits and marker bits are written only over background areas of the input image.

Further preferably, the spacing between adjacent rectangular segments is selected such that subjecting the watermarked image to a print-and-scan operation results in a plurality of the rectangular segments partially joining to form composite shapes.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

Before going into the details of the present invention, an exemplary bit-encoding scheme is presented. It is to be understood that multiple bit-encoding schemes are known in the art, and selection of a specific bit-encoding scheme is not critical to the present invention.

A user-provided message string is first converted into a suitable form by bit-encoding. The user-provided message string may be any character string, which for illustration purposes is herein assumed to be character string: "Hello world". This text character string (i.e. message string) is then re-rendered (i.e. encoded into) as a collection of logic low "0" bits and logic high "1" bits. In this encoding operation, every unique character in the message string is correlated to a corresponding unique numeric code, preferably in the range from 0 to 255. Each numeric code, in turn, is represented by a unique group of data bits, such as a byte (an 8-bit binary number). This may be achieved by converting the text characters in the user-provided message string into their ASCII code equivalent.

As it is known in the art, ASCII code is the American Standard Code for Information Interchange, and it provides a character-encoding scheme for converting text characters into machine readable, binary codes of eight bits each. For the present exemplary message string of "Hello world", the ASCII equivalent numeric codes for each text character are shown in Table 1 below.

TABLE 1

| Text Character | ASCII Code | Binary Code |
| --- | --- | --- |
| H | 72 | 01001000 |
| e | 101 | 01100101 |

TABLE 1-continued

| Text Character | ASCII Code | Binary Code |
| --- | --- | --- |
| l | 108 | 01101100 |
| l | 108 | 01101100 |
| o | 111 | 01101111 |
|   | 32  | 00100000 |
| w | 119 | 01110111 |
| o | 111 | 01101111 |
| r | 114 | 01110010 |
| l | 108 | 01101100 |
| d | 100 | 01100100 |

The "Hello world" message string can therefore be represented as the following binary bit-vector:
01001000011001010110110001101100011011110000
001110111011011110111001001101100 01100100
Since the message is now a collection of logic 0's and 1's, all that is needed is a way to represent a logic-0 and a logic-1 on a printed image. The representation of logic 0's and 1's is an important aspect of the present invention.

A novel, and printable, pattern symbol design (or bit-pattern design) for representing a 0-bit and a 1-bit for use in visible image watermarking is described below. Before describing the presently preferred bit-pattern symbol designs, however, it is beneficial to first define a "full-length message string" since it is currently preferred that user-provided message strings be formatted into a full-length message string prior to being watermarked (i.e. encoded) onto an input image. It is to be understood that the defined length of the "full-length message string" is a design choice.

It is presently preferred that all message strings that are to be encoded onto an input image be of equal length, and preferably be confined to a fix length of 64 bytes (or 64 one-byte characters) in total, which defines the "full-length message string". Smaller message strings may be padded with known bit-data to make their final bit-length equal to 64 bytes. For instance, the present exemplary message string, "Hello world", which consists of only 11 characters, may be rewritten as "Hello world" with multiple blank spaces appended at its end. In other words, 53 blank-space characters may be appended to the end of the original, 11-character "Hello world" message string to make it a full-length message string of 64 characters. Once the bit data representation of the full-length message string is obtained, a bit-pattern symbol design is necessary.

Figure 1:
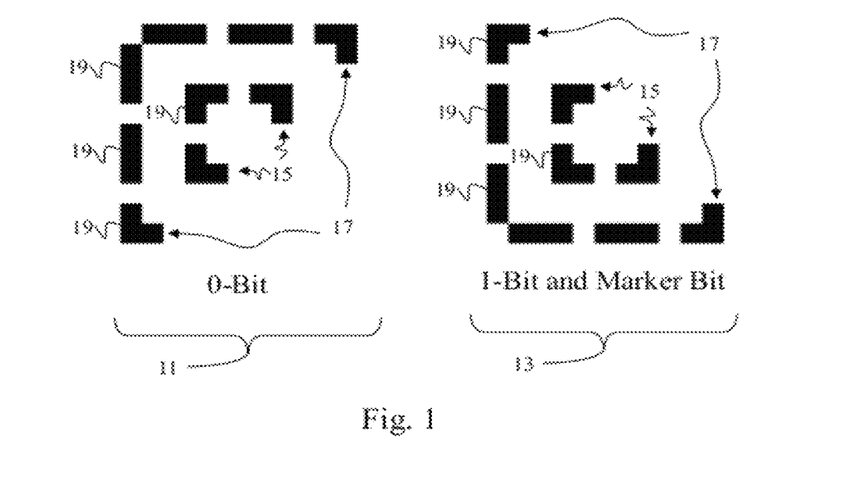
FIG. 1 shows two bit-pattern symbols for representing three bit type.

With reference to FIG. 1, the presently preferred embodiment uses two bit-pattern symbols 11 and 13 to represent three distinct bits. Bit-pattern 11 represents a logic-0 bit (i.e. a 0-bit), and bit-pattern 13 represents both a logic-1 bit (i.e. 1-bit) and a marker bit (i.e. MB).

When bit-pattern symbol 13 is used as a marker bit, it conveys no logic data, but is used to demarcate boundaries of a message string (or message block, as defined below) in order to facilitate a decoding procedure. A preferred method for distinguishing when bit-pattern symbol 13 is used a logic-1 bit and when it is used as a marker bit is explained more fully below.

The arrangement of bit-pattern symbols 11 and 13 that represent an input message string is preferably overlaid on background areas of the input image, and preferably is not overlaid on an input image's foreground pixels. Color selection of each bit-pattern symbol 11 and 13, however, may be adaptively changed so that bright regions of the input image have darker bit-pattern symbols overlaid on them, and dark regions of the input image have lighter bit-pattern symbols overlaid on them.

Both bit-pattern symbols 11 and 13 consists of two concentric, partial square outlines 15 and 17, each consisting of a collection of disjointed rectangular segments 19 arranged in series. The disjointed rectangular segments 19 have lengths longer than their widths.

Figure 2:
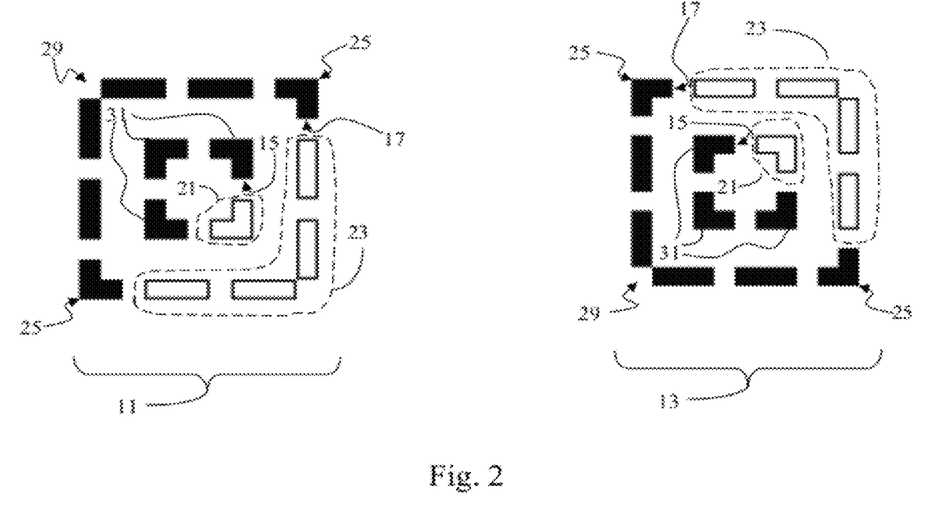
FIG. 2 is a more detailed illustration of the makeup of the bit-pattern symbols of FIG. 1.

With reference to FIG. 2, each partial square outline 15 and 17 is missing one corner region 21 and 23, respectively, along a common diagonal of the square-shape outlines. Each missing corner region 21 and 23 constitutes less than half its respective partial square outline 15 and 17. In this manner, the two corners of each concentric square outline adjoining its respective missing region extend partially into the region missing the corner.

In the preferred embodiment, the outer partial square outline 17 has two elbow-shaped rectangular segments forming two closed corners 25 at opposite corners of the partial square outline 17, and two touching rectangular shapes forming an open corner 29 in an L-shape configuration at the corner between the two closed corners 25.

Also in the preferred embodiment, the inner partial square outline 15 divides a square outline into four distinct segments 31, each defining a corner of the inner partial square outline 15. In this configuration, inner partial square outline 15 is missing the distinct segment 21 corresponding to the missing corner region 21.

An important characteristic of the present bit-pattern symbols is that after a print-and-scan cycle, the bit-pattern symbols appear as thin, at least partially continuous objects. That is, the print-and-scan cycle tends to blur bit-pattern symbols 11 and 13 such that it becomes more difficult to differentiate between individual disjointed rectangular segments 19, but at the same time their thinned-out look makes them less conspicuous to a casual viewer of the watermarked image. Although, the present bit-patterns are much lighter in intensity and create lesser visual disturbance to the end users, a connected component operation of appropriate size is effective for joining the disjointed rectangular segments of a blurred bit-pattern symbol 11 or 13, and correctly identify the different triangular bit-pattern symbols.

Before discussing how to successfully distinguish between bit-pattern symbols 11 and 13, it is beneficial to first discuss the topics of image erosion and image dilation in the field of image processing.

Figure 3A:
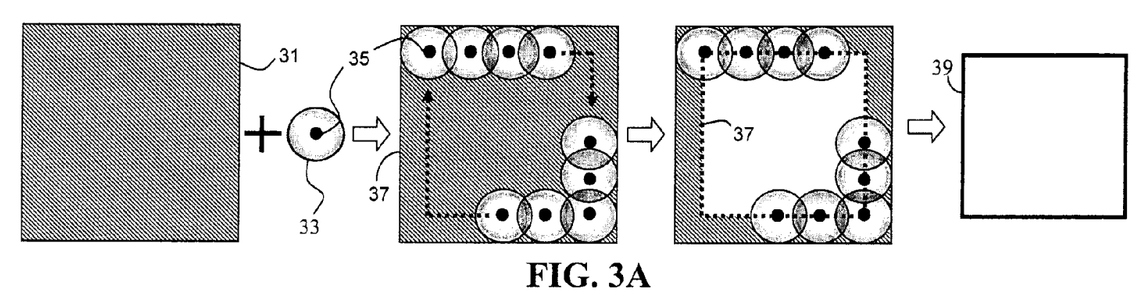
FIGS. 3A to 3C illustrate the image erosion and image dilation in image processing.

With reference to FIG. 3A, image erosion is generally applied to a binary image 31, and basically is a method by which the perimeter of the image 31 is restructured according to a predefined structuring element 33 of predefined shape. In the present example, image 31 defines a square, and structuring element 33 is a circle, or disc, with a center 35.

As structuring element 33 is moved along the inner perimeter of image 31, center 35 creates an outline 37 of new shape that follows the inner perimeter image 31. The exact shape of outline 37 is determined by how closely center 35 follows the inner perimeter, and this, in turn, is limited by the shape of structuring element 33 that moves along the inner perimeter. In the present example, the outline 37 defines a new square 39 smaller than original square 31 by an amount defined by the radius of circle 33.

Practically, when an image looks blotchy, like if it was drawn with a pen that was bleeding, image erosion has the effect of thinning out thick lines and better defining openings, such the hole within the letter "o".

Figure 3B:
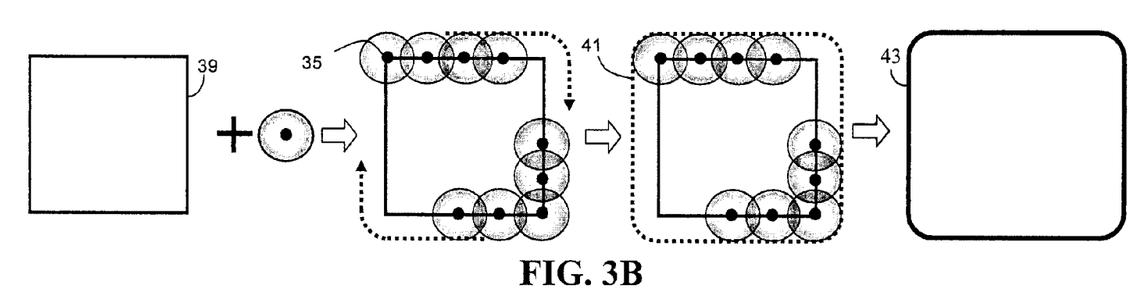

With reference to FIG. 3B, image dilation also restructures the perimeter of an image 39 by means of a structuring element 33, but in image dilation the center 35 of the structuring elements 33 is traced along the perimeter of the image 39. As structuring element 33 traces the perimeter of image 39, the outer perimeter of structuring element 39, itself, defines a new outline 41. In this way, the outline defined by the shape of structure element creates a new shape 43 larger than the original shape. In the present example, since structuring element 33 is circular, new shape 43 resembles a square of similar size as square 31, but with rounded corners. In effect, dilation is the opposite of erosion, and figures that are lightly drawn get thicker when dilated.

Figure 3C:
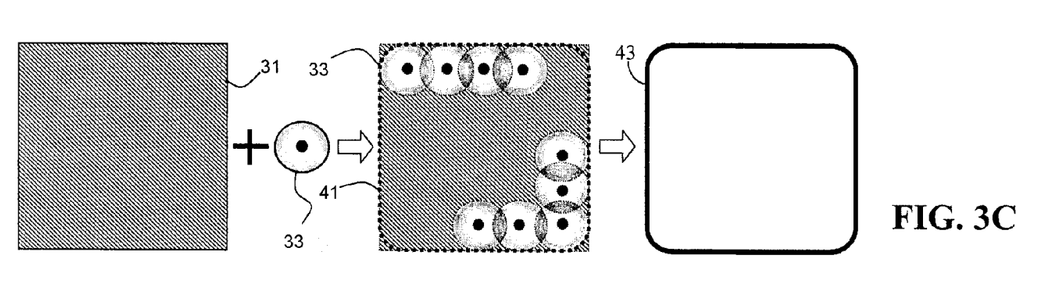

With reference to FIG. 3C, the effects of applying an erosion process followed immediately by a dilation processing to an image 31 using the same structuring element 33, has the effect of the outer Perimeter of the original image 31 warping itself onto the outer perimeter of the structuring element 33 as the structuring element 33 is moved along the inner perimeter of the original image 31. This results in a new outline 41 that follows the contours of the structuring element 31. Thus, the shape of the final image 43 is dependent upon the shape of the structuring element 33, and on how closely structuring element 33 follows the inner perimeter of the original image 31.

In the presently preferred embodiment, an erosion-dilation cycle is used to aid in detecting bit-pattern symbol 11 (i.e. a 0-bit) and bit-pattern symbol 13 (1-bit and MB).

Figure 4A:
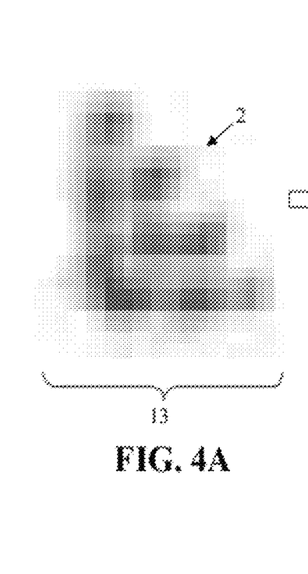
FIGS. 4A to 4E illustrates how an erosion-dilation cycle may be used in defining bit-pattern symbol from an input image.
Figure 4B:
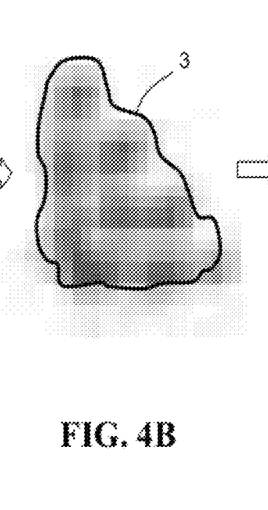

For example in FIG. 4A, a scanned image 2 of bit-pattern symbol 13 is shown. Although scanned image 2 is not well defined, in FIG. 4B, applying a connected components operation to scanned image 2 results in connected-component shape 3, which is better defined than scanned image 2, but still does follow the triangular shape of bit-pattern symbol 13 too closely.

Figure 4C:
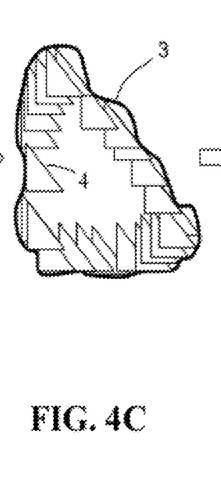

With reference to FIG. 4C, in the presently preferred embodiment, an image erosion-dilation cycle is used to help define the scanned bit-pattern symbol. A triangle-shaped, structuring element 4 (preferably having a right angle) is used. For illustrative purposes, the general arrangement of some triangular structuring elements 4 placed along the inner perimeter of connected-component 3 is shown.

Figure 4D:
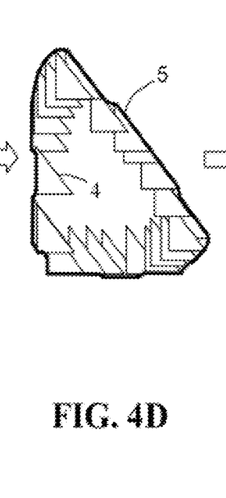
Figure 4E:
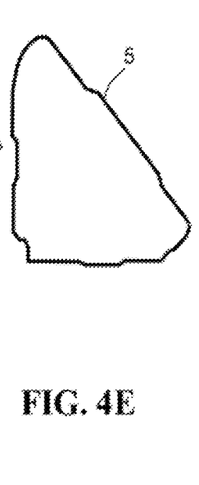

As is illustrated in FIGS. 4D and 4E, the result of applying an erosion-dilation cycle is to reshape connected-component shape 3 to produce a processed outline 5 with flatten sides along the angles defined by structuring element 4 and better defined corners. Since structuring element 4 is a triangle, the general shape of the processed outline 5 is triangular. It can then be determined if processed outline 5 matches either bit-pattern symbol 11 or 13 by determining if some predefined geometric parameters match (within a predefined margin of error) geometric parameters of bit-pattern symbols 11 and 13. These geometric parameters may be, for example, the angles between its sides, its perimeter to area ratio, height-base size, tangent and/or sine and/or cosine of value(s) of a specific corner angle, etc.

Once the triangular markings of bit-pattern symbols 11 and 13 have been determined, the next step is to determine the correct orientation of the markings in preparation for reading, i.e. deciphering, the watermarked image.

A benefit of the shape of bit-pattern symbols 11 and 13 is that accurate detection of bit-pattern symbols 11 and 13 is not affected by rotation of a watermarked image. That is, a message created using bit-pattern symbols 11 and 13 are decipherable only in their correct orientation.

The presently preferred embodiment uses a hit-and-miss morphological transform to detect the bits. These bits have the advantage of being rotationally salient. The hit-and-miss operation makes the patterns rotation sensitive as shown in FIGS. 5A-5D. As shown in FIG. 1, bit-pattern symbols 11 and 13 both require a flat wall (i.e. a vertical side) along a predefined orientation (i.e. from left to right). That is, the left-most side of each bit-pattern symbols 11 and 13 is a vertical wall. By detecting the orientation that provides bit-pattern symbols with a vertical side on its left-most side, one can discern the correct orientation for of the watermark message. More specifically, by rotating a small sample (preferably less than 10% by area) of the entire image (and preferably taken from a corner of the image) in 90 degree increments, identifying the possible bit-pattern shapes at each orientation, matching the possible bit-pattern shapes to the two true bit-pattern symbols 11 and 13 at each orientation, and identifying the orientation that provides the largest number of bit-pattern symbols (as identified by the matching of the above-described geometric parameters, including having their a vertical side (i.e. vertical wall) along the first side encountered when traversing from the predefined left-to-right orientation), one can determine the correct orientation for the watermark message.

Figure 5A:
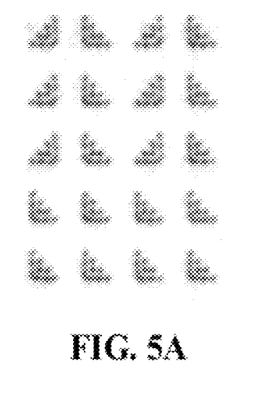
FIGS. 5A to 5D illustrate a method of identifying the correct orientation of an input image.

With reference to FIG. 5A, a small sample 10 (of unknown orientation) of a larger image is shown. The above described process for identifying bit-pattern symbols is applied. Since all bit-pattern symbols require that their left-most side (in the presently preferred embodiment) be a vertical wall, the orientation of FIG. 5a provides fourteen valid bit-pattern symbols within region 12.

Figure 5B:
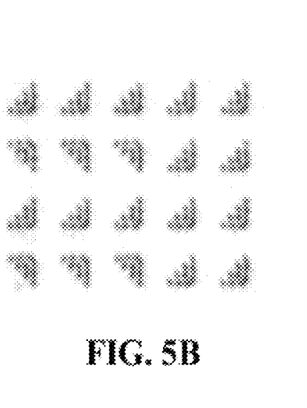

Rotating the image of FIG. 5A by 90 degrees results in the image of FIG. 5B. Again the above-described process for identifying bit-pattern symbols is applied. This orientation results in no matching bit-pattern symbols since none of the possible bit-pattern symbols in FIG. 5A have a vertical wall at their left-most side.

Figure 5C:
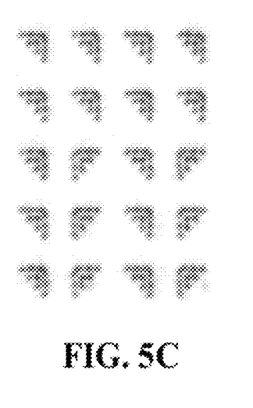

Rotating the image of FIG. 5B by 90 degrees results in the image of FIG. 5C. Applying the above-described process for identifying bit-pattern symbols renders only 6 valid bit-pattern symbols in regions 14 and 16.

Figure 5D:
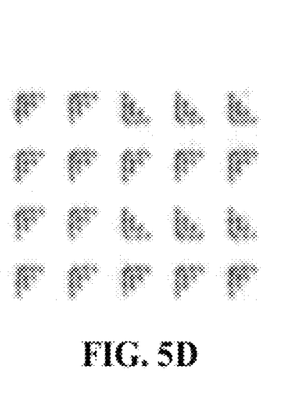

Rotating the image of FIG. 5C by 90 degrees results in the image of FIG. 5D. Applying the above-described process for identifying bit-pattern symbols to the image of FIG. 5D identifies twenty valid bit-pattern symbols. Since the orientation of FIG. 5D rendered the most valid bit-pattern symbols, its orientation is deemed the correct orientation for the entire original image, of which the image of 5D is only a small portion.

Thus, the correct rotation (portrait versus landscape, and right-side-up versus up-side-down) can be found by rotating a small sample of the image and finding orientation that renders the largest number of recognized bits (i.e. 0, 1 and marker bits, combined).

Now the topic turns to methods of encoding (i.e. writing) and decoding (i.e. reading or deciphering) watermark messages.

Figure 6:
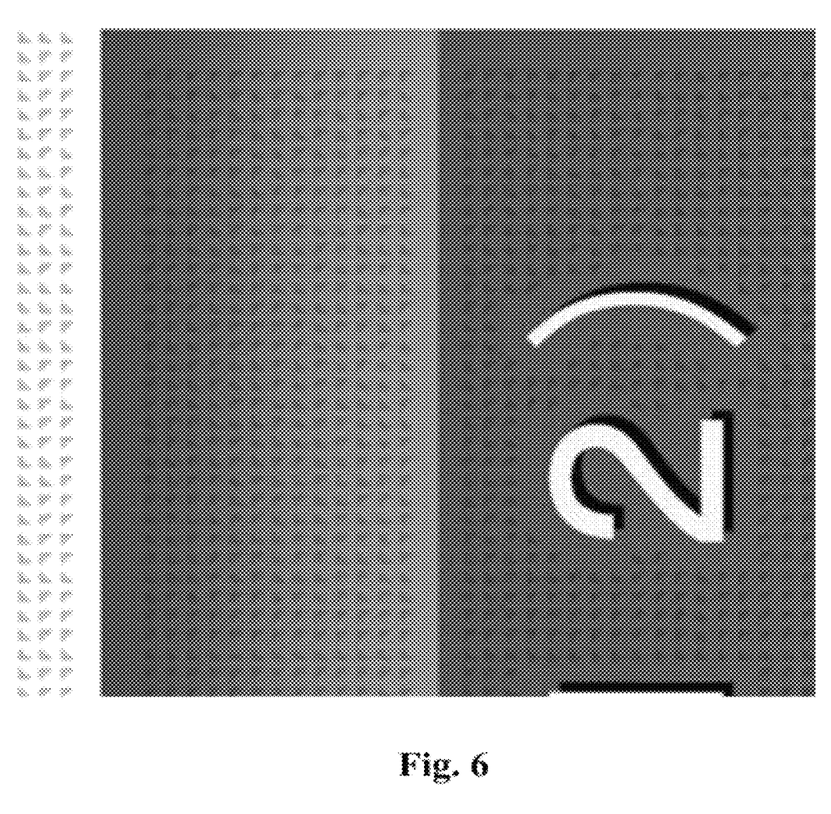
FIG. 6 is an example of how bit-pattern symbols are preferably laid on an image.

With reference to FIG. 6, in the presently preferred embodiment, the bit-pattern symbols are overlaid all around the actual foreground, and not just around the bounding box containing the foreground. Furthermore, the foreground pixels remain untouched, even from boundary marker bits. This feature enhances the aesthetic quality of the encoded image.

Both in preparation for message encoding and for message extraction, a connected components mask (i.e. a binary mask) is created. For message encoding, a first connected component mask of the input image upon which the watermark message is to be written is created. For message extraction, a second connected component mask of a scanned image (or the image from which a watermark message is to be extracted) is created. The basic difference between the first and second connected component mask is an area threshold parameter that determines the size of the connected components.

Figure 7:
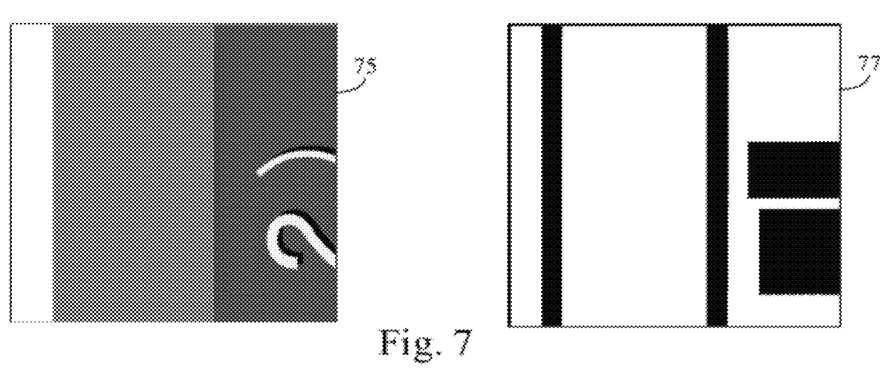
FIG. 7 illustrates the application of a first connected-component operation on an input image to identify region where bit-pattern symbols may be laid.

With reference to FIG. 7, image 75 shows a partial view of an input image upon which a watermark message is to be written. The objective in creating the first connected component is to identify those areas within input image 75 where the watermark message may be written. In the present example, image 77 is the resultant first connected component mask, which shows in white those areas where the watermark message may be written, and shows in black those areas where the watermark mark should not be written.

Figure 8:
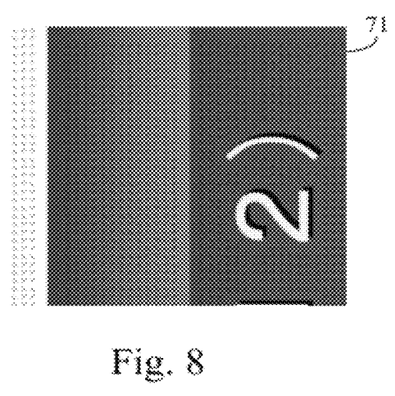
FIG. 8 is an example of watermarked image.

With reference FIG. 8, image 71 is an example of a watermarked message. In order to extract the watermark message from image 71, a second connected component mask is created to identify areas (i.e. bit images) of input image 71 that contain marker bit or data bit information within image 71.

Figure 9:
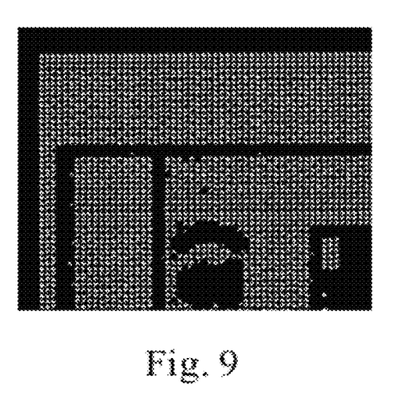
FIG. 9 illustrates the application of a second connected-component operation on a watermarked image to identify potential bit-pattern symbols that need to be deciphered.

FIG. 9 shows the result of applying a second connected component process to a watermarked image. Possible bit-pattern symbols (i.e. bit images) that should be read are identified as white areas in a black field.

Figure 10:
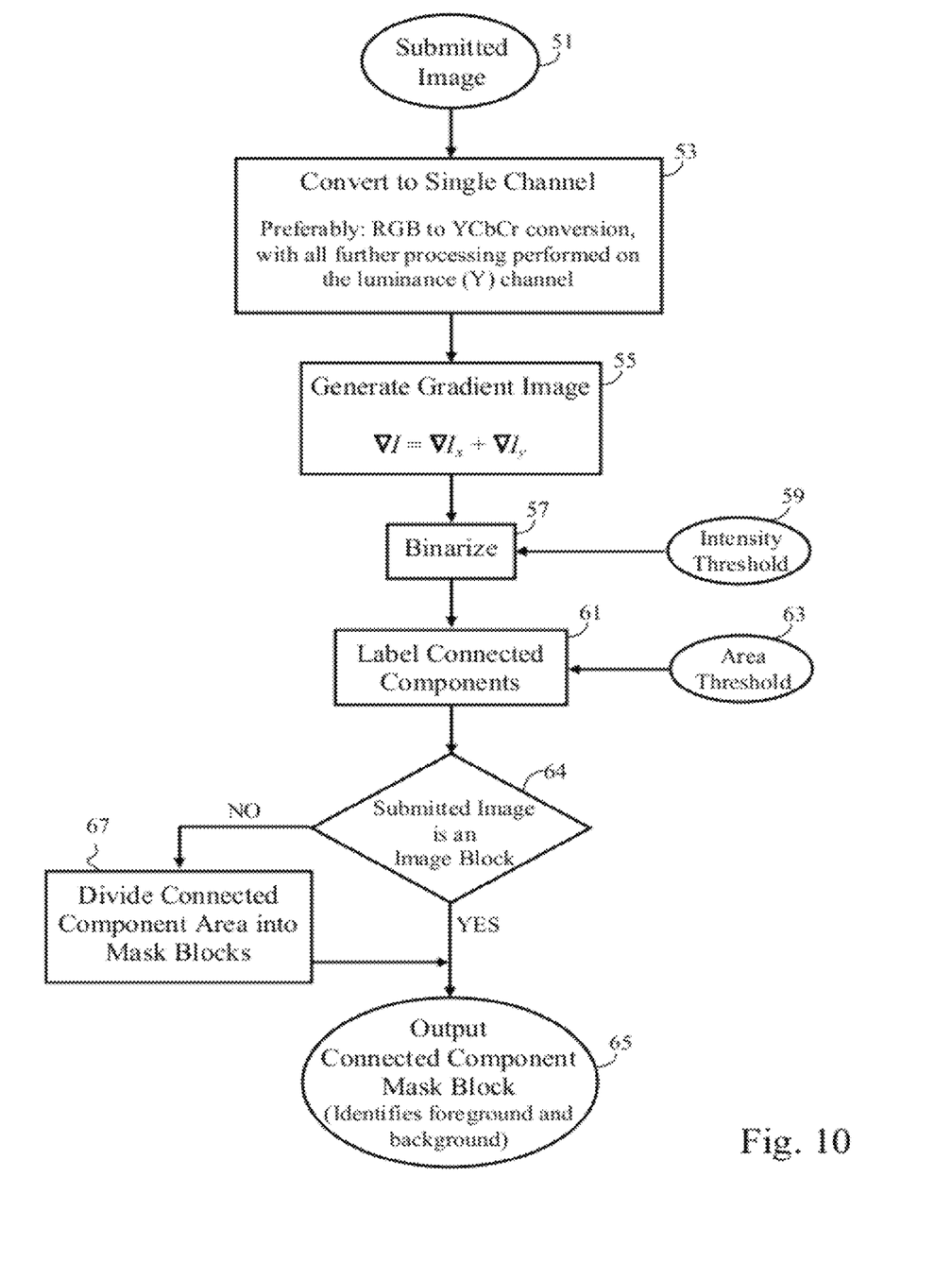
FIG. 10 shows a preferred method of creating a connected components mask.

A general process for construction of a connected component mask (for either the first or second connected component mask) is shown in FIG. 10. To create the connected components mask, a submitted image 51 is first converted to a single channel image (step 53). It is to be understood that submitted image 51 may be the input image, in its entirety. Alternatively, the input image may be divided into multiple image blocks, and each image block may be processed individually as the submitted image in step 51. If the image block is for encoding purposes, then the image block may coincide in size and location with the message blocks delineated by marker bits, as is explained below. In one embodiment of the present invention, an entire image is submitted for message encoding, and multiple image blocks are submitted for message extraction, but this a design choice.

If separate image blocks are submitted individually, such that process steps 51-63 are separately applied to each image block (step 64=YES), then the output mask at step 65 would be a mask block of size equal to the image block. Alternatively, if the submitted image 51 is the whole input image, in its entirety, such that steps 51-63 are applied to the entire input image (step 64=NO), then the resultant connected component area mask may be divided into mask blocks of size equal to an image block (step 67) prior to outputting the result at step 65.

The conversion to a single channel image at step 53 may be achieved by applying an RGB to YCbCr conversion to image 51, and then performing all further processing only on the luminance (Y) channel. A light intensity gradient image of the luminance channel image (i.e. intensity 1) is then the generated (55) using the following relationship:

$$\nabla I = \nabla I_x + \nabla I_y$$

Next, a binarized image of the light intensity gradient image is created (57) by comparing each intensity value to a single intensity threshold 59. Connected components of binarized image are then labeled (61). An area mask (i.e. binary mask) can then be created (65) by discarding all connected components whose sizes vary more than ±25% of an area threshold 63. The size of area threshold 63 depends on whether one is creating a first connected component mask for message insertion (i.e. writing) or a second connected component for message extraction (i.e. reading). For message insertion, area threshold 63 defines an area for inserting a watermark message, and in one embodiment, generally separates the foreground from the background of the image. For message extraction, area threshold 63 is much smaller, and preferably of similar size as the area of a pattern bit.

If the image has not yet been watermarked, then the watermark message, as encoded, is overlaid (i.e., printed) using the above described bit-pattern symbols 11 and 13. Identification of the background and foreground sections of the input image is advantages for applying optional watermarking variations. For example, in a preferred embodiment, data bit patterns and marker bit patterns are printed solely on background sections of the input image.

If desired, the data bit patterns and marker bit patterns may be varied in intensity depending on the general intensity of their surrounding image pixels. That is, bit patterns may be printed darker than their surrounding image bits in areas where the input image is light (i.e. above a predefined intensity threshold), and bit patterns are printed lighter than their surrounding image in areas where the input image is dark (i.e. not above the predefined intensity threshold).

Conversely, if the image is a previously watermarked image (such as a scan image of a previously printed watermarked image), then the area mask (i.e. mask block) will highlight (i.e. create pattern images of) the bit-pattern symbols for ease of extraction and decoding.

Figure 11:
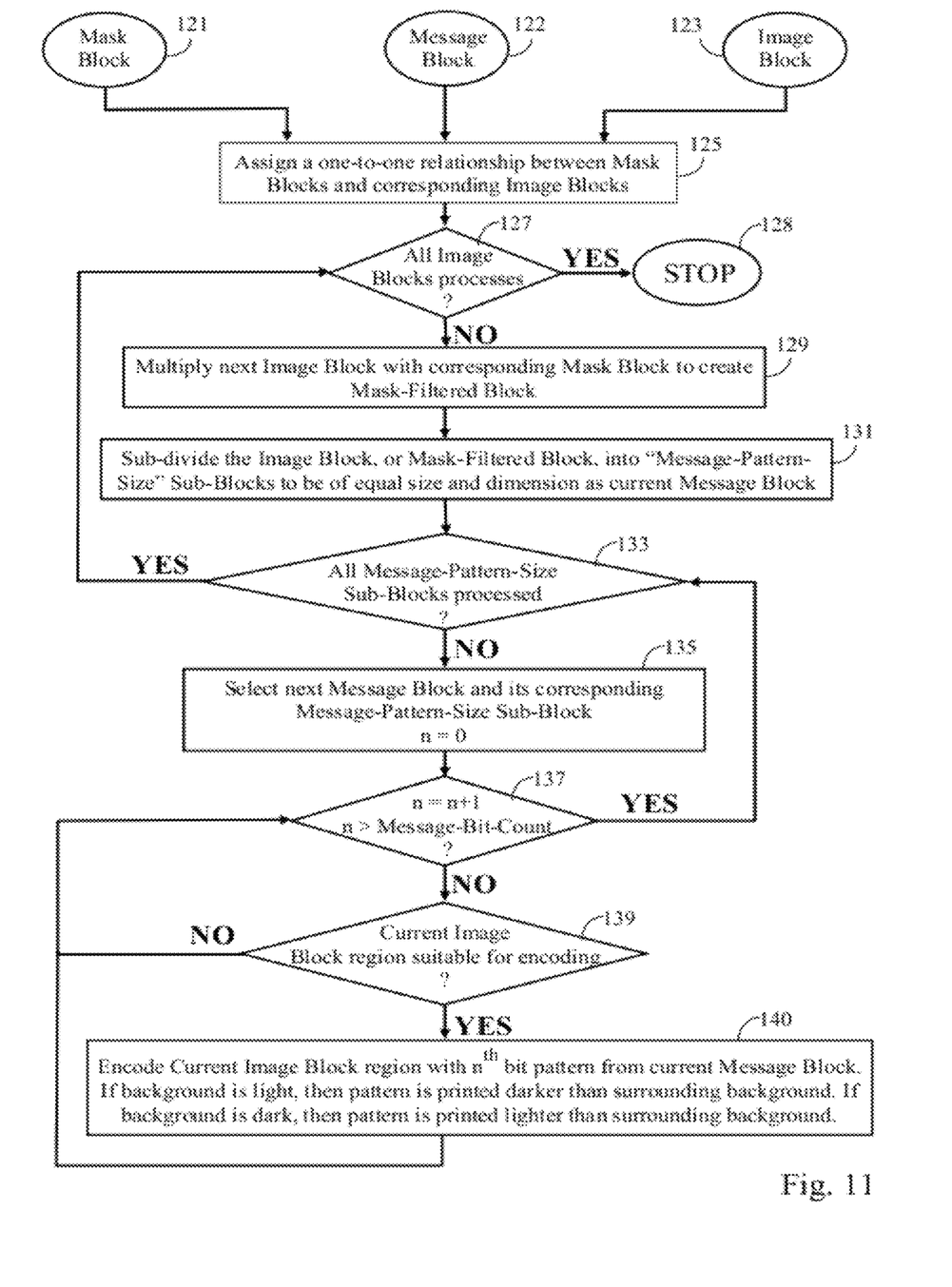
FIG. 11 illustrates an exemplary watermark encoding sequence.

With reference to FIG. 11, a general watermark encoding sequence may begin by providing a mask block 121, a message block 122, and an image block, and a one-to-one relation is established between each mask block and its corresponding mask block (step 125). An input image may be divided into multiple image blocks, and the connected components mask may also be divided into multiple mask blocks of equal number and size as the image blocks.

A formatted message block may be of fixed size. It is to be understood that the message blocks are not necessarily square in shape nor are they the same size as the image blocks. It is presently preferred that the message blocks be smaller than the image blocks.

If all image blocks have been processed, then the encoding sequence ends at step 128, but if all image blocks have not yet been processed (step 127), then based on the message length, an image block 123 extracted from the input image is multiplied by its corresponding mask block 121 to create a mask-filtered block (step 129). The resultant mask-filtered block, which masks out areas of the image block where bit patterns should not be encoded, is further subdivided into message-pattern-size sub-blocks.

When all message-pattern-size sub-blocks have been processed (step 133=YES), i.e. watermark encoded, then the process returns to step 127 to determine if another image block remains to be processed.

Assuming that a message-pattern-size sub-blocks requires encoding (step 133=NO), the bit patterns defined by the formatted message that defines a current message block is overlaid on (i.e. encoded onto) its corresponding message-pattern-size sub-block (step 135). It is to be noted that bit patterns are not overlaid on foreground regions of the image block.

The total number of watermark pattern symbols in a message block is identified as "message-bit-count", and the encoding of the watermark message begins by defining a counting variable n equal to 0 (step 135). When counting variable n exceeds the message-bit-count (step 137=YES), it means that all of the watermark pattern symbols have been encoded (i.e. incorporated into the current message sub-block), and processing returns to step 133 to determine if any additional sub-blocks remain to be encoded.

If n is not higher than the message-bit-count (step 37=NO), then it is determined if the current image block region defined by the current message-pattern-size sub-block is suitable for encoding (step 139). That is, if step 139 identifies the current sub-block region not suitable for encoding (step 139=NO), then the processing returns to step 137. Conversely, if step 139 identifies the current sub-block region as suitable for encoding (step 139=YES), then processing proceeds to step 140, and the nth bit pattern from the message block is encoded onto the current region of the image block.

Preferably, the bit encoding further follows a predefined mapping scheme. That is, the location of the first data bit within each block is defined according to the mapping scheme.

During the encoding phase the bit patterns are overlaid on an input image. The presently preferred method of overlaying the patterns uses a mapping scheme designed to prevent users from rendering the watermark recovery phase inoperable. Prior art encoding schemes could be defeated if an attacker drew a dark circle at exactly the same location, for every message block. By doing so, the recovery phase could not verify any watermark message within any block, and the attacker had thus destroyed the entire watermarking scheme, since no message could be generated in the end. This simple attack was enough to destroy all the messages consistently.

The new scheme safeguards against such an attack. Even if an attacker draws similar circles at the same location for every block, still the mapping ensures that the missing bits can be obtained from the remaining blocks. According to the new scheme, encoding bits are overlaid at the equivalent locations according to a fixed mapping. This means that if the location of a message bit is x in one block, then it is either x or (x+Δ) in all other blocks, where Δ is a fixed pre-defined position shift. This approach will be illustrated in terms of the location of the first data bit that is part of a watermark message within each message block.

As is explained above, the presently preferred embodiment does not print data bits or marker bits over foreground regions. Therefore, for purposes of identifying a location x, or a location x+Δ, bit positions corresponding to foreground regions are neglected.

Figure 12:
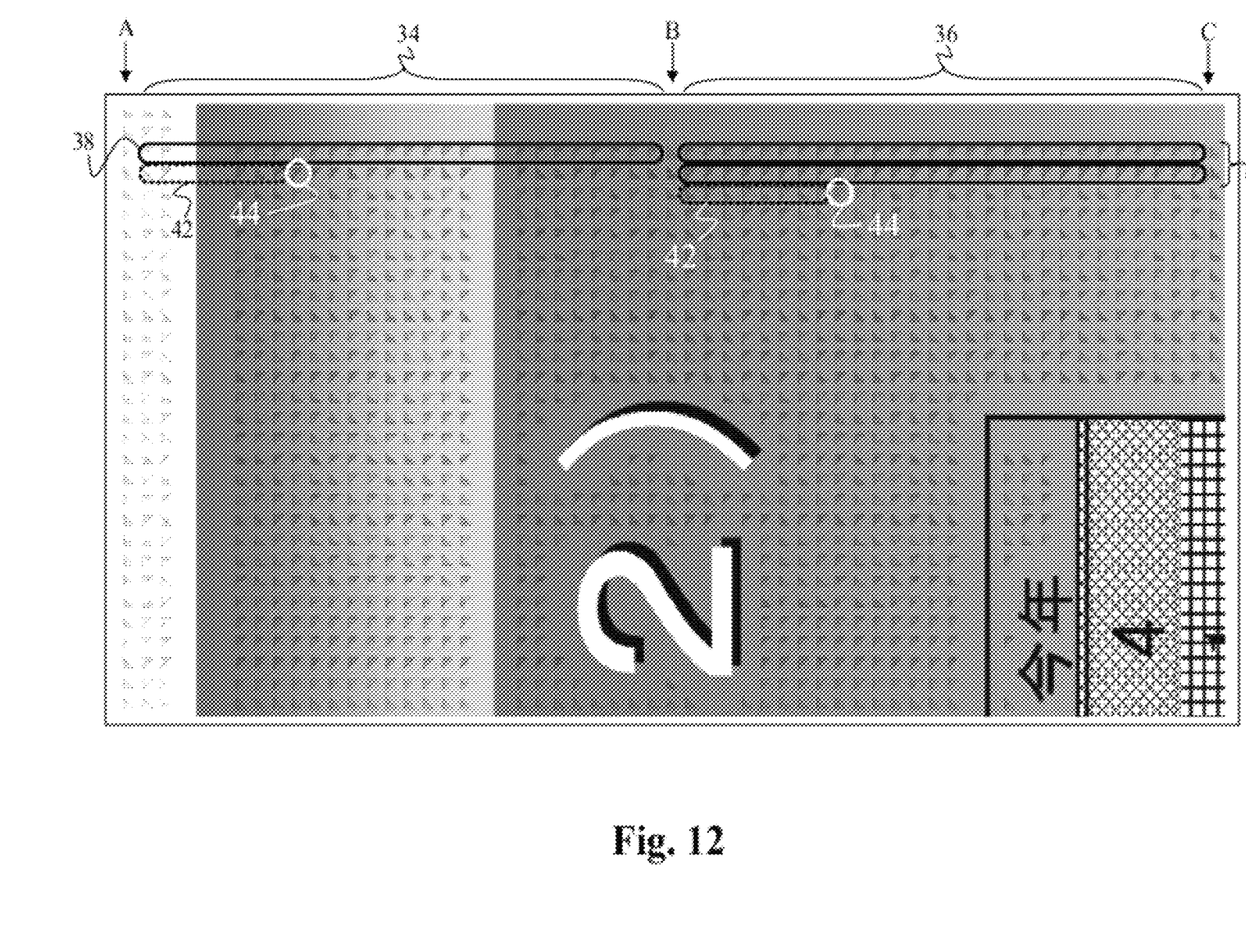
FIG. 12 illustrates a preferred message mapping scheme.

With reference to FIG. 12, columns A, B, and C are columns of marker-bits, and each defines a block boundary. In the present example, column B divides two consecutive message blocks 34 and 36. To ensure easy decoding, the beginning of consecutive message blocks are alternatively padded with one row (38) or two rows (40) of 0-bits. Additionally, the row on which the message starts is padded with a predefined, eight-bit pattern 42 that immediately precedes the beginning of the message 44. Preferably, the predefined eight-bit pattern is a series of alternating is and 0s, starting with a 1-bit. This generates a location mapping such that the first valid bits always starts at location (dim*n+8), where dim is the dimension of the message block (in bits) and n is the number of rows of 0-bits used for padding (1 or 2 in the present example). This ensures that the valid bits always correspond to a fixed location mapping. Although only two mappings are used in the current implementation, multiple mappings can be easily incorporated in the current design.

In the presently preferred embodiment, the first message block is padded with an initial one row of 0-bits, the second message block is padded with an initial two rows of 0-bits, the third message block is padded with an initial one row of 0-bits, and so on. Thus, identifying the marker bits that demarcate the boundaries of message blocks is a critical aspect of the present invention. However, as is explained above, the marker bits are preferably identified by the same bit-pattern symbol (13 from FIG. 1) that identifies a logic-1 bit. Thus, a method of determining when a bit-pattern symbol 13 is meant to represent a marker bit and when it is meant to identify a logic-1 bit is desirable.

The marker bits identified from the bit mask images are used to demarcate the block boundaries. After the block boundaries have been determined, then each block is decoded individually. For any particular row or column, the number of identified bit-pattern symbols 13 (i.e. 1-bits or marker bits) are compared to the number of identified bit-pattern symbols 11 (i.e. 0-bit bits), weighted (i.e. divided) by the total number of valid bit-pattern symbols (total of 0-bits and 1-bits), as an indicator of whether the identified bit-pattern symbols 13 represent marker bits and thus indicates a block boundary pattern or regular data pattern (i.e. data bits). Each column and row is thus given an edge score defined as:

$$ES = \frac{([\#1 - \text{bits}] - [\#0 - \text{bits}])}{(\text{Total } \# \text{valid bits})} \quad (1)$$

Figure 13A:
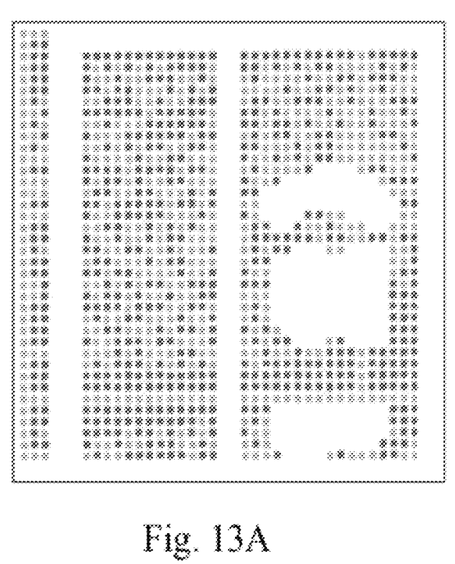
FIG. 13A illustrated sample from a watermarked image.
Figure 13B:
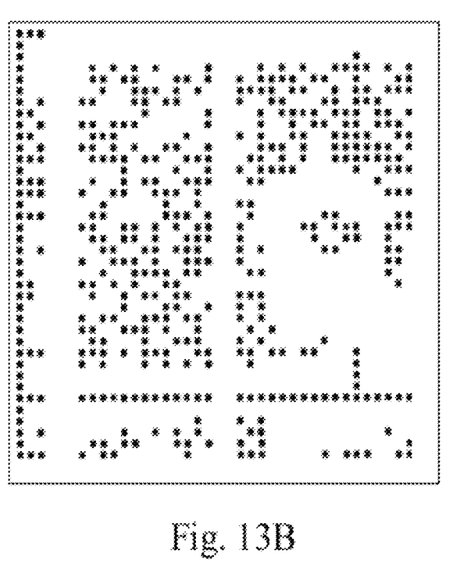
FIG. 13B illustrates the identified logic-1 bits from the sample of FIG. 13A.
Figure 13C:
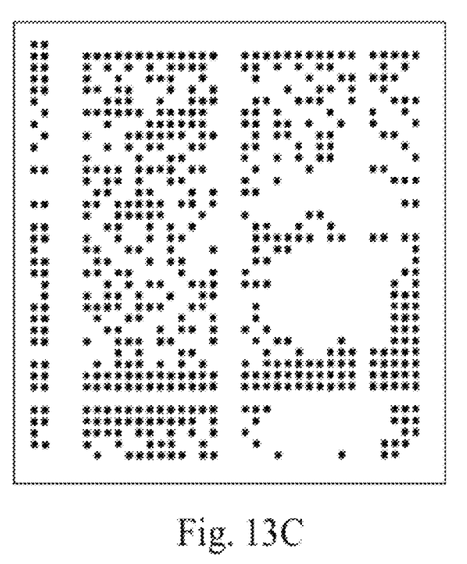
FIG. 13C illustrates the identified logic-0 bits from the sample of FIG. 13A.

For example, FIG. 13A shows part of an image including a mixture of message block boundaries and data bits. FIG. 13B shows the deciphered bit-pattern symbols 13 (i.e. logic-1 bits), and FIG. 13C shows the deciphered bit-pattern symbols 11 (i.e. logic-0 bits). Comparing the first row of logic-1 bits in FIG. 13B to the corresponding first row position in FIG. 13C, which has no 0-bits, renders an edge score of $$ES = \frac{(3-0)}{(3)} = 1$$

The edge score for the second row is $$ES = \frac{(1-2)}{(3)} = -0.33$$

Figure 14:
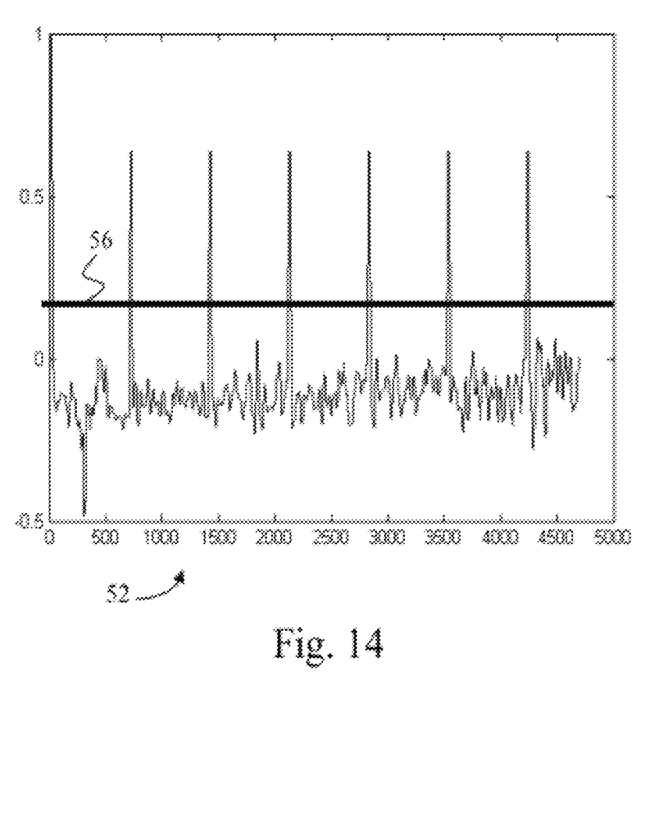
FIG. 14 illustrates a row histogram created from the identified logic-1 bits along the bit rows of a watermarked image.
Figure 15:
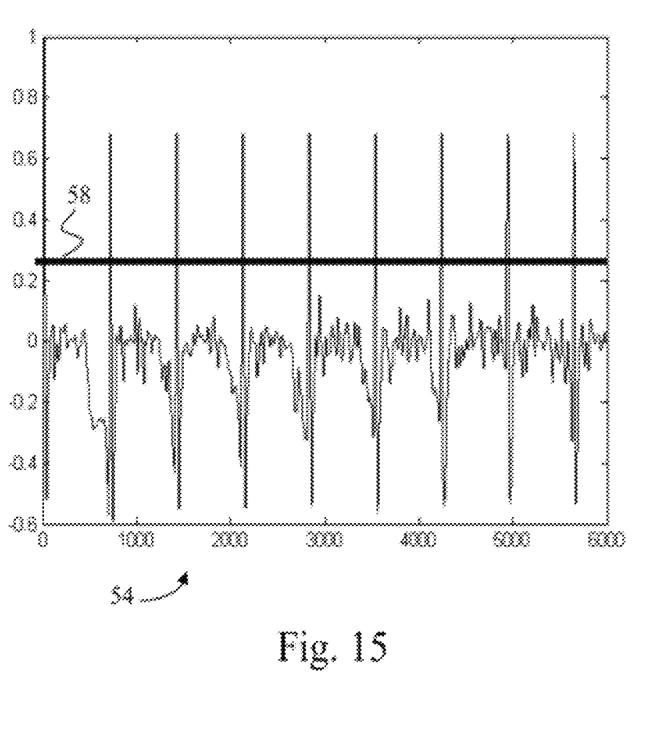
FIG. 15 illustrates a column histogram created from the identified logic-1 bits along the bit columns of a watermarked image.

This process is continued for all rows and columns (i.e. horizontal and vertical directions). A histogram is then constructed from the collection of row edge scores and column edge scores. A row histogram 52 of row edge scores is shown in FIG. 14, and a column histogram 54 of column edge scores is shown in FIG. 15. A first threshold 56 is applied to row histogram 52 and a second threshold 58 is applied to column histogram 54. Each of first and second thresholds 56 and 58 is created from the mean of its respective histogram plus 1.75 times its respective histogram's standard deviation. Although this is fairly effective at identifying horizontal and vertical block boundaries, a few smaller peaks within a histogram may be large enough to cross its respective threshold and result in a false-positive reading. This problem can be reliably solved by additionally taking the median of the inter-peak distances of each histogram as an inferred block dimension (horizontal row dimension or vertical column dimension depending of the histogram). Thus, if a smaller peak falsely registers as a block boundary, it can be eliminated by noting that it does not occur at the expected boundary location based on the inferred block dimension. In other words, the rows whose edge score is not lower than the row threshold and whose position lies within a first predefined distance from a position defined by the horizontal dimension are deemed horizontal block boundaries. Preferably, this first predefined distance is a number of bit spaces. Similarly, the columns whose edge score is not lower than the column threshold and whose position lies within a second predefined distance from a position defined by the vertical dimension are deemed vertical block boundaries. Preferably, this second predefined position is a number of bit spaces.

Having identified the message block boundaries, the next step is to decipher the watermark message encoded within each block.

Since each block holds a copy of the same message, the true identity of a logic-1 bit or a logic-0 bit can be discerned by comparing the bit value at the same bit location within the other blocks.

Basically, decoding collects all the bits from the corresponding locations from all the message blocks, and infers the most dominant bit at each bit location. As a simplified example, if the watermark messages were 4 bits each, and the decoded data for five watermark messages (from five respective blocks) looks like the following bit sequence, where a hyphen "-" denotes a missing bit (i.e. an undecipherable bit):

```
1 - - 0
1 1 - 0
- 1 0 0
0 0 0 0
```

Logic-1 bits are the dominant bit in the first two columns, and logic-0 bits are the dominant bits in the last two columns. Therefore, the final message inferred from such a collection is 1 1 0 0, which is a bit wise maximum of the message bits.

By using this method, No string matching is needed, as is used in prior art approaches. Since the bit wise maximum operation is already done, one does not need any string matching. Additionally, this method responds better to missing bits since undecipherable bits can be inferred from the dominant bit.

Additionally, this method does not require block wise message decoding. This message collects the block wise messages as a collection of bits, with missing bits represented as unknowns. Hence, currently this method does not generate block wise messages.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A method of watermarking a text message onto an input image, comprising the following steps:
   (a) converting the text message into a binary-coded data bit sequence of logic-0 data bits and logic-1 data bits, and arranging said binary-coded data bit sequence within a message block defined by block boundaries consisting of non-data, marker bits;
   (b) assigning a first bit-pattern symbol to logic-0 data bits within said binary-coded data bit sequence, said first bit-pattern symbol being a first predefined geometric arrangement of disjointed rectangular segments laid out to form concentric triangular arrangements;
   (c) assigning a second bit-pattern symbol to logic 1 data bits within said binary-coded data bit sequence, and assigning said second bit-pattern symbol to said non-data, marker bits, said second bit-pattern symbol being a second predefined geometric arrangement of disjointed rectangular segments laid out to form concentric triangular outlines;
   (d) mapping a plurality of said message blocks onto said input image, and writing said first and second bit-pattern symbols on said input image in according to said mapping.

2. The method of claim 1, wherein said first bit-pattern symbol forms a first right triangle, said second bit-pattern symbol forms a second right triangle, said first and second right triangles being of similar size, and said first and second right triangles having a constant orientation;
   wherein said constant orientation is such that when said first and second right triangles are arranged side-by-side:
   (A) the apex of said first right triangle is aligned with the base of said second right triangle, and the apex of said second right triangle is aligned with the base of said first right triangle;
   (B) the side of said first triangle is parallel to the side of said second triangle; and
   (C) the hypotenuse of the first right triangle is aligned to intersect the alignment of the hypotenuse of the second right triangle.

3. The method of claim 2, wherein:
   said side of said first right triangle is on the left-hand-side of said first right triangle; and
   said side of said second right triangle is on the left-hand-side of said second right triangle.

4. The method of claim 1, wherein said concentric triangular outlines are formed from two concentric, partial square outlines, each consisting of a collection of said disjointed rectangular segments arranged in series, the disjointed rectangular segments having lengths longer than their widths, and
   each partial square outline missing one corner region along a common diagonal of the partial square outlines, wherein each missing corner region is less than half its respective partial square outline, and the two corners of each concentric square outline adjoining its respective missing region extend partially into the region missing the corner.

5. The method of claim 1, wherein step (a) includes:
   alternating padding the top of consecutive message blocks with one or two rows of logic-0;
   inserting a predefined data bit sequence of fixed bit-length immediately in front of the first data bit of the binary-coded data bit sequence.

6. The method of claim 1, wherein a correct orientation of said input image is determined by placing said input image in four orientations shifting from 0 degrees, to 90 degrees, to 270 degrees, to 360 degrees and determining the number of valid bit-pattern symbols recoverable at each orientation, wherein the orientation that renders the largest number of valid bit-pattern symbols is deemed the correct orientation.

7. The method of claim 1, wherein second bit-pattern symbols assigned to logic-1 data bits are discerned from second bit-pattern symbols assigned to marker bits demarcating block boundaries by:
   (i) for each row of bit-pattern symbols, determining the number of first bit-pattern symbols and the number of second bit-pattern symbols, assigning a row-edge-score by subtracting the number of first bit-pattern symbols from the number of second bit-pattern symbols and dividing the result by the total number of bit-pattern symbols in that row, creating a row histogram of said row-edge-scores, thresholding the row histogram with a threshold value determined from the mean of all row-edge-scores plus 1.75 times the row histogram's standard deviation, wherein any row with a row-edge-score above the row threshold is identified as a potential row-boundary consisting marker bits demarcating a block boundary.

8. The method of claim 7, wherein step (i) further includes taking the median of the inter-peak distances of the row histogram as an inferred horizontal block dimension, and only potential row-boundary rows whose location when calculated into the median of the inter-peak distances does not change the previous median value by more than a first predefined tolerance are deemed horizontal block boundaries.

9. The method of claim 8, wherein said first predefined tolerance is 5%.

10. The method of claim 7, further including:
(ii) for each column of bit-pattern symbols, determining the number of first bit-pattern symbols and the number of second bit-pattern symbols, assigning a column-edge-score by subtracting the number of first bit-pattern symbols from the number of second bit-pattern symbols and dividing the result by the total number of bit-pattern symbols in that column, creating a column histogram of said column-edge-scores, thresholding the column histogram with a threshold value determined from the mean of all column-edge-scores plus 1.75 times the column histogram's standard deviation, wherein any column with a column-edge-score above the column threshold is identified as a potential column-boundary consisting marker bits demarcating a block boundary.

11. The method of claim 10, wherein step (ii) further includes taking the median of the inter-peak distances of the column histogram as an inferred vertical block dimension, and only potential column-boundary rows whose location when calculated into the median of the inter-peak distances does not change the previous median value by more than a second predefined tolerance are deemed horizontal block boundaries.

12. The method of claim 11, wherein said second predefined tolerance is 5%.

13. The method of claim 1, wherein said binary-coded data bit sequence is determinable by collecting all the logic-0 bits and logic-1 bits from corresponding locations within all the message blocks, identifying bits locations that cannot be identified as a logic-0 or a logic-1 as unknown, identifying the dominant data bit at each bit location while ignoring bit locations identified as unknown, and assigning each bit location its dominant data bit value.

14. The method of claim 1, wherein said data bits and marker bits are written only on background areas of said input image.

15. The method of claim 1, wherein the spacing between adjacent rectangular segments is selected such that subjecting the watermarked image to a print-and-scan operation results in a plurality of said rectangular segments partially joining to form composite shapes.

* * * * *